(12) United States Patent
Peters et al.

(10) Patent No.: US 11,175,238 B2
(45) Date of Patent: Nov. 16, 2021

(54) METHOD AND APPARATUS FOR ANALYZING INHOMOGENEOUS BULK CARGO

(71) Applicant: mtm plastics GmbH, Niedergebra (DE)

(72) Inventors: Tobias Peters, Gernrode (DE); Ralf Böttner, Sondershausen (DE); Torsten Meyer, Ellrich (DE); Michael Scriba, Bayreuth (DE)

(73) Assignee: mtm plastics GmbH, Niedergebra (DE)

( * ) Notice: Subject to any disclaimer, the term of this patent is extended or adjusted under 35 U.S.C. 154(b) by 385 days.

(21) Appl. No.: 16/305,234

(22) PCT Filed: May 31, 2017

(86) PCT No.: PCT/EP2017/063121
§ 371 (c)(1),
(2) Date: Nov. 28, 2018

(87) PCT Pub. No.: WO2017/207610
PCT Pub. Date: Dec. 7, 2017

(65) Prior Publication Data
US 2020/0256805 A1    Aug. 13, 2020

(30) Foreign Application Priority Data

May 31, 2016    (DE) .............. 10 2016 109 999.6

(51) Int. Cl.
*G01N 21/00*    (2006.01)
*G01N 21/94*    (2006.01)
(Continued)

(52) U.S. Cl.
CPC ........... *G01N 21/94* (2013.01); *B07C 5/3422* (2013.01); *G01N 21/359* (2013.01); *G01N 21/3554* (2013.01)

(58) Field of Classification Search
CPC .. G01N 21/94; G01N 21/3554; G01N 21/359; B07C 5/3422; G01J 3/02
See application file for complete search history.

(56) References Cited

U.S. PATENT DOCUMENTS 5,794,788 A * 8/1998 Massen ................. B07C 5/3408
                                                      209/524
8,422,003 B2    4/2013 Hartrumpf et al.

FOREIGN PATENT DOCUMENTS

DE    4340795 A1    3/1995
DE    19800521 A1    7/1999
(Continued)

OTHER PUBLICATIONS

Moroni et al., "PET and PVC Separation with Hyperspectral Imagery", Sensors, 2015, pp. 2205-2227, vol. 15.
(Continued)

*Primary Examiner* — Abdullahi Nur
(74) *Attorney, Agent, or Firm* — The Webb Law Firm

(57) ABSTRACT

The invention relates to a method and an apparatus for easily determining the composition of plastic waste that has been pressed into bales. Here, the proportion of plastic on at least one surface of a bale is determined with the aid of an NIR spectrum and, optionally, an image from a visual system. In a preferred embodiment, the proportion of plastic of a bale is determined on a plurality of sides of a bale. This increases the accuracy of the method. By way of the method according to the invention and the apparatus according to the invention, it is consequently possible to undertake a quality control of plastic waste that has been pressed into bales, which quality control is fast, reproducible and documentable.

20 Claims, 2 Drawing Sheets

(51) Int. Cl.
*B07C 5/342* (2006.01)
*G01N 21/3554* (2014.01)
*G01N 21/359* (2014.01)

(56) References Cited

FOREIGN PATENT DOCUMENTS

| DE | 202007014466 U1 | 2/2008 |
|---|---|---|
| EP | 2823945 A2 | 1/2015 |
| JP | 2002267599 A | 9/2002 |
| JP | 2010094634 A | 4/2010 |

OTHER PUBLICATIONS

"Monitoring bales of plastic waste", Jun. 12, 2015, p. 1-4, Retrieved from https://web.archive.org/web/20150612023701/http://www.perception-park.com/monitoring-bales-plastic-waste.

* cited by examiner

METHOD AND APPARATUS FOR ANALYZING INHOMOGENEOUS BULK CARGO

CROSS REFERENCE TO RELATED APPLICATIONS

This application is the United States national phase of International Application No. PCT/EP2017/063121 filed May 31, 2017, and claims priority to German Patent Application No. 10 2016 109 999.6 filed May 31, 2016, the disclosures of which are hereby incorporated in their entirety by reference.

FIELD OF THE INVENTION

The invention relates to a method and an apparatus for analyzing the plastic component of inhomogeneous bulk cargo which has been compressed into bales. The determination of the proportion of polypropylene and polyethylene in a bale is preferably enabled by the present invention.

DESCRIPTION OF RELATED ART

Greatly varying methods are known for reclaiming plastic from plastic-rich waste products, such as packaging, foils, composite materials, and hollow bodies. This involves consumer waste, which predominantly arises in the domestic sector in household garbage. In many countries worldwide, this plastic waste is reclaimed by separate collection from the household garbage and supplied to recycling. Less attention has been paid up to this point to plastic waste which arises in the municipal and industrial sectors. This includes the so-called hard plastics, such as crates and containers, toys, industrial packaging, pipes, household products, garden furniture, medical packaging and devices, suitcases, and kitchen appliances.

Polyolefins is the collective term for types of plastic which contain various polyethylenes, such as LDPE (low-density polyethylene), LLDP (linear low-density polyethylene), and HDPE (high-density polyethylene) and polypropylene. Together, they form over 47% (11.2 million tons) of the total yearly consumption of plastic of 24.1 million tons in Europe.

The loosely occurring unsorted plastic waste is generally compressed to form bale goods. Both the storage and also the transportation are thus facilitated. During the compression into bales, the loose plastic waste is pressed layer-by-layer onto one another until a so-called bale results. The dimensions of the base and side surfaces of such a bale are usually approximately in the range of 1 m×1 m.

The bales are then delivered, inter alia, to processing plants, in which individual components are separated from the unsorted plastic waste and processed for reuse. In particular polyolefins are of particular interest in this case. Upon the delivery of the raw material in the form of bale goods to processing plants, it is of great economic interest for the operator of the processing plants to know the quality of the bales as accurately as possible. The "quality of the bale goods" in this context describes the component of plastics suitable for recycling in the bale. In this case, for example, the proportion of polyolefins in the overall bale is of particular significance. The proportion of reusable plastics in the raw good, which is delivered in the form of the compressed bale, is thus essential for the yield of reusable plastics which can be obtained by means of conventional methods of reprocessing from a bale. However, it is known that the quality of the delivered bale goods can vary by up to 30%, which has a strong effect on the yield of the applied reprocessing method. A quality check can presently only be carried out with great effort using the means known from the prior art. In addition, the quality check is not reproducible using the means and measures presently available. Moreover, only inadequate documentation of the quality check can be performed. A preservation of evidence as proof of the supplied quality of the bale goods is thus only possible inadequately. However, in case of complaints this is indispensable for an objective evaluation.

The quality of the bales is conventionally determined by hand by random samples. For this purpose, a random sample is taken from a bale by an employee of the operator of the processing plant and sorted by hand. A random sample typically comprises approximately 80 kg of waste mixture from a bale. After the sorting by hand, the determination of the proportions of desired plastics, such as polyethylene and polypropylene, and of contaminants, for example, metal, wood, dirt, rocks, undesired types of plastic, etc. is performed. This proportion determination is typically performed by determining the weight by means of weighing. Four hours are required for evaluating the quality of a single bale in this manner. Therefore, it is possible to check at most 2-3 bales per day. However, on average up to 50 bales are delivered to the processing plants per truckload. It is not uncommon for up to 70 truckloads per day to be processed in a processing plant. The quality control of delivered bales is therefore presently completely incapable of enabling a comprehensive judgment of the quality of individual bales with respect to the proportion of the desired types of plastic. Since the proportion of the desired types of plastic can vary by up to 30%, it is moreover impossible to draw conclusions regarding the quality of a second bale and/or the quality of an entire truckload from the evaluation of the quality of one bale. The operators of waste processing plants therefore bear a high economic risk, since a payment has to be paid to the suppliers of the bales, the level of which is independent of the quality of the bales. Moreover, contaminants contained in the bales have to be disposed of in a costly manner by the operators of the waste processing plants.

SUMMARY OF THE INVENTION

The invention is therefore based on an object of providing a method and an apparatus, which enable rapid, reproducible, and documentable quality control of plastic waste compressed into bales.

The present invention provides a method for this purpose which comprises the following steps:
  recording a near infrared spectrum of at least one side of the bale,
  optionally recording an image of the at least one side of the bale by way of a visual system for detecting contaminants,
  optionally conveying the bale,
  analyzing the recorded near infrared spectrum/spectra and optionally analyzing the recorded image of the at least one side of the bale by way of a visual system with respect to the composition of the bale, and
  storing the near infrared data and the determined composition of the bale,
  wherein the proportion of plastics is determined.

The method can be carried out according to the invention with the aid of an apparatus which comprises
  at least one near infrared camera, optionally at least one visual system for recording an image, optionally a means for conveying a bale, an analysis apparatus for near infrared spectra, optionally an analysis apparatus for images of a visual system, and a storage medium.

DETAILED DESCRIPTION OF THE INVENTION

The present invention provides a method which comprises the following steps:

recording a near infrared spectrum of at least one side of the bale, optionally recording an image of the at least one side of the bale by way of a visual system for detecting contaminants, optionally conveying the bale, analyzing the recorded near infrared spectrum/spectra and optionally analyzing the recorded image of the at least one side of the bale by way of a visual system with respect to the composition of the bale, and storing the near infrared data and the determined composition of the bale, wherein the proportion of plastics is determined.

In one embodiment of the method according to the invention, a near infrared spectrum (NIR spectrum) of at least one side of the bale is recorded, i.e., the component of the near infrared radiation reflected from the surface of the bale is detected.

The NIR spectrum has the property that it is specific for various materials. In particular, the NIR spectra of various plastics, for example, of polyethylene and polypropylene, can be differentiated from one another and from other plastics. Therefore, the proportion of plastics on a surface of a bale can be determined with the aid of the NIR spectrum on this surface. A significant advantage of NIR technology is that the results of the measurements are well reproducible. The results of the NIR measurements are obtained in the form of spectra and can be stored and thus easily documented. A preservation of evidence of the quality of delivered bale goods, for example, with respect to suppliers, is thus enabled.

To determine the proportion of specific types of plastic, in particular of polyolefins, as accurately as possible, in one preferred embodiment of the invention, NIR spectra are recorded of at least 2, 3, 4, or 5 sides of the bale or of all 6 sides of the bale.

The recording of NIR spectra of more than one side of the bale is particularly advantageous since the surfaces of the two cover surfaces of the bale, from which the loose plastic waste was compressed, merely depict the composition of the first or last pressed layer, respectively, of the loose plastic waste, while the lateral surfaces of the bale depict a cross section of the edges of all compressed layers of the loose plastics. The analysis of the NIR spectra of the lateral surfaces thus reflects the material composition of all compressed layers, while the NIR spectra of the cover surfaces merely depict the material composition of the first or last layer, respectively, of the loose plastic waste. Moreover, the bales are typically delivered welded in film, wherein the film used for the welding is generally not transparent. It thus cannot be readily differentiated from the outside whether the surface of the bale examined by means of a near infrared camera even represents a lateral surface, which depicts all compressed waste layers, or whether the surface to be examined represents one of the two above-described cover surfaces.

In one embodiment of the method according to the invention, NIR spectra of 1 lateral surface, preferably of 2 lateral surfaces or 3 lateral surfaces, and one cover surface are recorded.

In one particularly preferred embodiment of the method according to the invention, NIR spectra of all 4 lateral surfaces of the bale and an NIR spectrum of a cover surface are recorded.

During the compression of the plastic waste, contaminants, for example, wood, metal, dirt, rocks, or undesired plastics are frequently also pressed into the bale. Such contaminants can also be detected and identified in the NIR spectrum. In addition, water as a contaminant is also identifiable in the NIR spectrum, and therefore a determination of the water component can be performed.

Black and very dark plastic particles (for example, dark brown, dark blue, dark gray, dark red) cannot reflect or can only inadequately reflect infrared beams. The darker the color of the plastic particles, the higher the proportion of the infrared radiation which is absorbed by the plastic particles. Therefore, plastic components having black or very dark colors cannot be detected or can only be detected inadequately using the NIR technology. Therefore, visual methods are preferably used according to the invention for detecting dark contaminants and/or plastics having dark color. The use of cameras, for example, color cameras, is particularly preferable.

In one embodiment, the method according to the invention therefore comprises the recording of images of the bales by a visual system. In a particularly preferred embodiment, this visual system is a color camera. With the aid of the imaging of the visual system, the proportions of dark contaminants and dark plastics on the surface of the bale can be determined.

In one embodiment of the method according to the invention, the bales can be guided past an apparatus, which comprises the near infrared camera and optionally a visual system, with the aid of a transportation means for recording the NIR spectra and optionally for recording images by way of a visual system. In one preferred embodiment of the method according to the invention, the transportation means is a transportation belt.

In a further preferred embodiment of the method according to the invention, the transportation means is a turntable, whereby the bales are rotated about one of the axes thereof by a rotatable apparatus. The individual sides of a bale are thus accessible for the recording of an NIR spectrum and optionally for the recording of an image by a visual system.

According to the invention, the recorded NIR spectra are subsequently analyzed in an analysis apparatus for NIR spectra. The proportion of individual types of plastic per bale is computed on the basis of the spectra, for example, by means of suitable conventional software. In one preferred embodiment, the proportion of polyolefins per bale is computed. In one very particularly preferred embodiment, the proportion of polyethylene and polypropylene per bale is computed.

The analysis apparatus preferably comprises a conventional processor, and software for controlling the components and for measured value processing and analysis. The analysis apparatus is, for example, a control computer or a process computer.

If NIR spectra of multiple sides of one bale are recorded, the results of these measurements can thus be further processed in a suitable manner to obtain representative values for the proportion of the individual types of plastic per bale. Suitable further processing is represented, for example, by the calculation of a mean value from all measured values. The calculation of a weighted mean value from the individual measurement data is also possible, wherein the measurement data of the various sides of a bale are weighted using a suitable value.

In a further embodiment of the method according to the invention, an image is recorded by a visual system, preferably a color camera, of the at least one side of the bale, of which an NIR spectrum is also recorded. The image of the visual system can be analyzed with respect to the proportions of contaminants or also plastics on the surface of the bale, which cannot be detected with the aid of the NIR technology because of the very dark color these contaminants or plastics. The images recorded by means of the visual system can be analyzed either manually or with the aid of suitable conventional image analysis software.

In a further embodiment of the method according to the invention, images of all sides of the bale are recorded by a visual system, preferably a color camera, of which NIR spectra were also recorded, and correspondingly incorporated into the analysis with respect to contaminants and dark plastics.

If a weighted average of the measurement data of the NIR spectra of the different sides of the bale is computed, the proportion of contaminants which was determined by the visual system can thus be used as the basis for the selection of a weighting value. This means the proportions of types of plastics are determined for one side of a bale by an NIR spectrum. The proportion of contaminants of a very dark color is also determined on the basis of the image by a visual system for the same side of the bale and used as the basis for the selection of the weighting value.

The NIR spectra and the proportions computed therefrom of specific types of plastic per bale are stored according to the invention on a suitable storage medium. The storage medium can be a component of the analysis apparatus, for example. The images of the visual system are also stored. An extensive and in particular evidence-preserving documentation of the quality of the bale goods is thus enabled. The storage of the data is possible in an uncomplicated manner over a longer period of time, whereby the judgment of the quality of suppliers of the bales over a longer period of time is enabled.

Using the methods known from the prior art for quality checking, it is only possible for an employee to carry out a check of 2-3 bales per day, as described above already. The method according to the invention enables a substantially faster quality check of a bale. The recording of an NIR spectrum, optionally an image using a visual system, and the analysis and storage of this data can take place without problems within a few minutes, for example, one minute. Even in the case of the recording of NIR spectra and optionally of images by means of a visual system of more than one side of the bale, the processing time is in the range of minutes. The present invention therefore provides a method which carries out the quality control of bales at a speed which enables all delivered bales of a truckload, and/or all bales delivered in a processing plant per day, to be subjected to a quality control in a short time. Therefore, in comparison to the previously used methods, not only is a substantially more extensive quality control, but rather even a fully comprehensive quality control is possible. Due to the evidence-preserving storage of the results of the quality controls, it is now possible for the operators of the processing plants to recognize and reject entire truckloads of plastic waste which have bales having only an inadequate proportion of the desired types of plastic already during the intake control. The cost risk for the operators of the processing plants can thus be substantially minimized. The method according to the invention additionally results in an improvement of the cost efficiency of the quality control.

In a further embodiment, the invention relates to an apparatus for carrying out the above-described method, wherein the apparatus comprises
  at least one near infrared camera,
  optionally at least one visual system for recording an image,
  optionally a means for conveying a bale,
  an analysis apparatus for near infrared spectra,
  optionally an analysis apparatus for images of a visual system, and
  a storage medium.

In one embodiment, the apparatus according to the invention comprises at least one near infrared camera for recording an NIR spectrum. It is also possible that the apparatus according to the invention comprises 1, 2, 3, 4, 5, or 6 near infrared cameras.

In a further embodiment, the apparatus according to the invention comprises a near infrared camera for recording NIR spectra and a visual system for recording images, wherein the visual system is preferably a color camera.

In a further embodiment, the apparatus according to the invention comprises 1, 2, 3, 4, 5, or 6 NIR cameras for recording NIR spectra and at least one visual system for recording images, wherein the visual system is preferably a color camera. It is also possible that the apparatus according to the invention comprises 1, 2, 3, 4, 5, or 6 NIR cameras and 1, 2, 3, 4, 5, or 6 visual systems for recording an image.

In one embodiment of the invention, the bale, the quality of which is to be checked, is conveyed by means of a transportation apparatus past an apparatus on which the NIR cameras are attached. Such an apparatus, on which the NIR cameras are attached can be, for example, a bridge-like structure. The NIR cameras are advantageously attached in this case on the bridge-like structure such that an NIR spectrum can be recorded of 3 sides of the bale as it passes through the bridge-like structure. In a particularly preferred embodiment of the invention, in addition to the at least one NIR camera, the apparatus always comprises a visual system for recording an image. In a further preferred embodiment, the apparatus according to the invention also always comprises, in addition to each NIR camera, a visual system, for example, a color camera, for recording an image. Using this embodiment, it is possible to check 3 sides of a bale simultaneously both by means of NIR spectroscopy and also visually by means of a color camera. This embodiment thus enables a rapid process sequence and can be integrated into the following processing processes by the transportation of the bales on a transportation belt.

In another embodiment of the invention, an NIR camera can be attached to a column, which optionally additionally comprises a visual system such as a color camera. A rotatable apparatus, such as a turntable, on which the bale to be checked is located, can be located in front of such a column, for example. By rotating the bale with the aid of the rotatable apparatus, 4 sides of the bale can be checked in succession. In one preferred embodiment of the invention, a girder element, which can also comprise an NIR camera, is located above the rotatable apparatus and perpendicularly to the column, which comprises an NIR camera. In addition to the NIR camera, a visual system such as a color camera can likewise be attached to said girder. The girder is preferably positioned such that an NIR spectrum of the upper side of the bale can additionally be recorded by the NIR camera, while NIR spectra of the lateral surfaces are recorded by the NIR camera attached to the column. This embodiment enables 5 sides of a bale to be checked with little time expenditure. This embodiment thus enables a rapid process sequence and can be integrated into the following processing processes by the transportation of the bales on a transportation belt furthermore comprised by the apparatus according to the invention.

In one preferred embodiment of the invention, at least one NIR camera and optionally at least one visual system for recording images are attached to a mobile apparatus. This mobile apparatus can be, for example, a forklift or a mobile structure. The advantage of this embodiment is that the apparatus can be used more flexibly. It is thus possible, for example, to carry out a first quality check of bales already upon the transportation arrival, while still on the truck, i.e., before the unloading thereof. Before the unloading, a forklift or a mobile structure, which is equipped with the apparatus according to the invention, can drive past the bales, which are still located on a truck, and subject the accessible sides of the bales to a first quality check even before the unloading. In the case of inadequate quality, the quality of the bales can thus be decided even before the unloading. Therefore, in case of doubt, entire truckloads can be protested immediately, storage capacity can be saved, and resulting costs can be saved.

According to a further embodiment of the invention, the NIR camera and optionally a visual system, such as a color camera, can be attached to a portable carrier apparatus. The size of the overall construction can thus be kept sufficiently low that all elements of the apparatus according to the invention can be stowed in a passenger automobile. This embodiment enables quality checks to be performed flexibly at any arbitrary location. The analysis apparatus can be, for example, a laptop in this embodiment.

By way of the method according to the invention and the apparatus according to the invention, it is possible to determine the quality of plastic waste pressed into bales easily, possibly independently of location, and flexibly. In this case, the proportion of plastics is determined on at least one surface of a bale with the aid of an NIR spectrum and optionally an image of a visual system. In one preferred embodiment, the proportion of plastics of a bale can be determined on multiple sides of a bale. The accuracy of the method is thus enhanced. It is therefore possible by way of the method according to the invention and the apparatus according to the invention to perform a quality control of plastic waste pressed into bales which is rapid, reproducible, and documentable.

BRIEF DESCRIPTION OF DRAWINGS

The invention will be explained hereafter on the basis of 3 figures.

FIGURES

Figure 1:
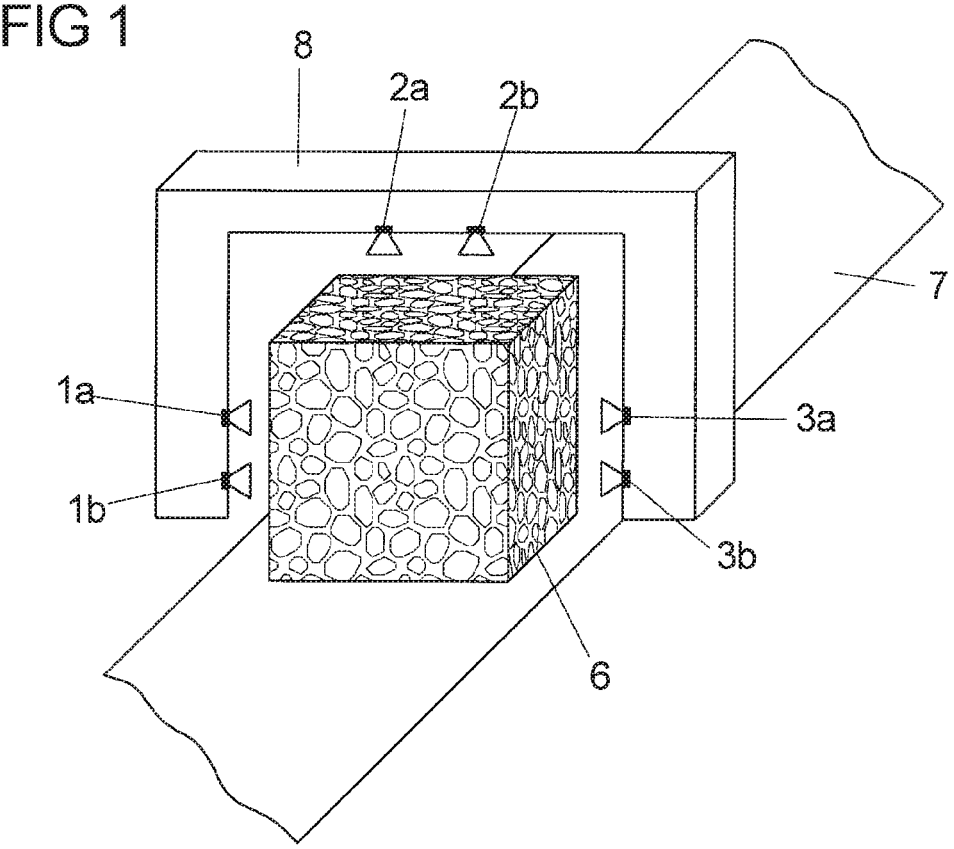

FIG. 1 shows an embodiment of the apparatus according to the invention having 3 NIR cameras and 3 visual systems on a bridge-like structure, wherein the bale is transported using a transportation belt.

Figure 2:
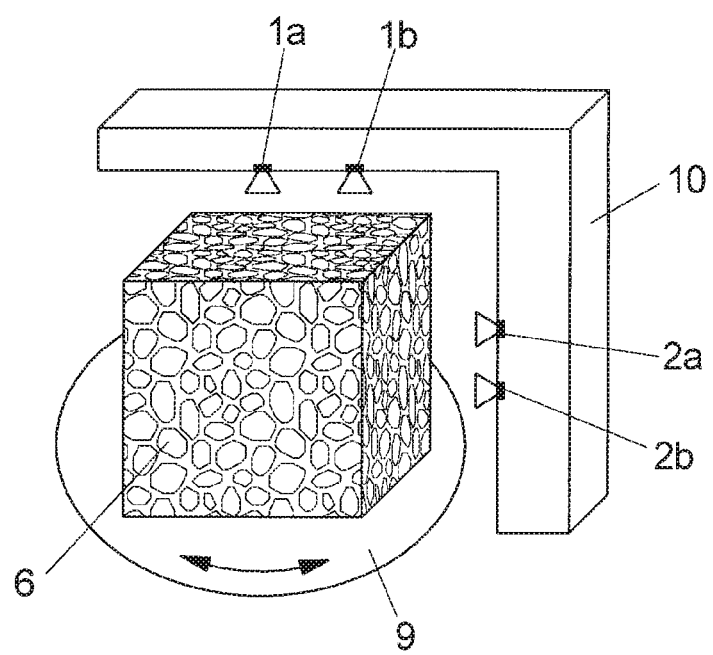

FIG. 2 shows an embodiment of the apparatus according to the invention having 2 NIR cameras and 2 visual systems on a column having a girder element, wherein the bale is located on a turntable.

Figure 3:
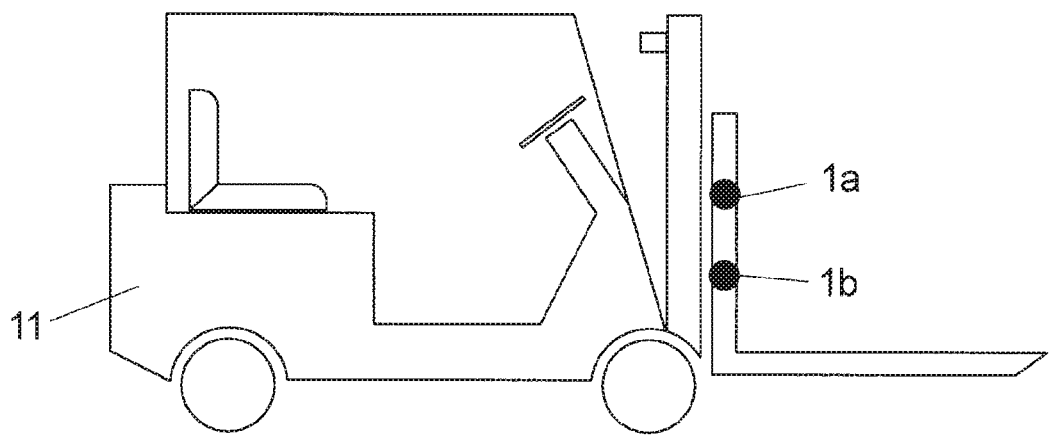

FIG. 3 shows an embodiment of the apparatus according to the invention, wherein an NIR camera and a visual system are attached to a forklift.

DESCRIPTION OF THE INVENTION

ON

FIG. 1 shows an embodiment of the apparatus according to the invention, wherein the bale (6) is conveyed by a transportation belt (7) through a bridge-like structure (8). The bridge-like structure (8) consists of two columns and a crossmember, which connects the two columns. An NIR camera (1a) and a visual system (1b) are attached to one column, an NIR camera (3a) and a visual system (3b) are also attached to the second column. An NIR camera (2a) and a visual system (2b) are located on the crossmember. All NIR cameras and the visual systems are aligned such that a spectrum or an image, respectively, of the respective lateral surface of the bale (6) is recorded, which faces in the direction of the respective NIR camera or the respective visual system. In this embodiment, an NIR spectrum and an image can be recorded by a visual system simultaneously from 3 sides of the bale (6).

FIG. 2 shows a further exemplary embodiment of the apparatus according to the invention. The bale (6) is located on a turntable (9). A column having a girder element (10) is located adjacent to the turntable. An NIR camera (1a) and a visual system (1b) are attached to the girder element, an NIR camera (2a) and a visual system (2b) are also located on the column. The column is attached to the turntable such that the NIR camera (2a) and the visual system (2b) can record an NIR spectrum or an image, respectively, of the side of the bale (6) facing toward them. The girder element protrudes over the bale (6) in this case such that the NIR camera (1a) and the visual system (1b) can record an NIR spectrum or an image, respectively, of the side of the bale (6) facing toward them. By rotating the bale (6) with the aid of the turntable, 4 sides of the bale (6) can be checked in succession.

FIG. 3 shows a further embodiment of the apparatus according to the invention, wherein an NIR camera (1a) and a visual system (1b) are attached to the movable part of a forklift (11). The forklift (11) can then drive past bales (6) which are stored on a truck, for example, and subject the accessible sides of the bales (6) to a quality check.

REFERENCE SIGNS

1a NIR camera
1b visual system
2a NIR camera
2b visual system
3a NIR camera
3b visual system
6 bale
7 transportation belt
8 bridge-like structure
9 turntable
10 column having girder element
11 forklift

The invention claimed is:
1. A method for analyzing the plastic proportion of inhomogeneous bulk cargo, which is compressed into bales, comprising:
recording at least one near infrared spectrum of at least one side of a bale, optionally recording an image of the at least one side of the bale by way of a visual system for detecting contaminants, analyzing the recorded near infrared spectrum/spectra and optionally analyzing the recorded image of the at least one side of the bale by way of the visual system with respect to a composition of the bale, and storing data of the near infrared spectrum and a determined composition of the bale, wherein a proportion of plastics is determined.

2. The method as claimed in claim 1, wherein a near infrared spectrum of 1, 2, 3, 4, 5, or 6 sides of the bale is recorded and analyzed.

3. The method as claimed in claim 1, wherein a near infrared spectrum of at least one lateral surface and at least one cover surface of the bale is recorded and analyzed.

4. The method as claimed in claim 1, wherein a mean value or a weighted mean value is calculated from the NIR spectra of various sides of the bale.

5. The method as claimed in claim 1, wherein the visual system is a color camera.

6. The method as claimed in claim 1, wherein an image is recorded by the visual system of the at least one side of the bale of which an NIR spectrum is also detected.

7. The method as claimed in claim 1, wherein a proportion of contaminants is determined by way of the image which was recorded using the visual system.

8. The method as claimed in claim 7, wherein a weighting factor in the calculation of a weighted average is determined on the basis of the proportion of contaminants which was determined by the visual system.

9. The method as claimed in claim 1, wherein a proportion of contaminants and/or water in the bale is determined via the NIR spectrum.

10. An apparatus for carrying out the method as claimed in claim 1, wherein the apparatus comprises:

at least one near infrared camera, optionally at least one visual system for recording an image, optionally a means for conveying a bale, an analysis apparatus for near infrared spectra, optionally an analysis apparatus for images of a visual system, and a storage medium.

11. The apparatus as claimed in claim 10, wherein the apparatus comprises the visual system in addition to each NIR camera.

12. The apparatus as claimed in claim 10, wherein the means for conveying the bale is embodied as a transportation belt.

13. The apparatus as claimed in claim 10, wherein the means for conveying the bale is embodied as a turntable.

14. The apparatus as claimed in claim 10, wherein the near infrared camera and optionally the visual system for recording images are attached to a mobile apparatus.

15. The apparatus as claimed in claim 10, wherein the near infrared camera and optionally the visual system for recording images are attached to a portable carrier apparatus.

16. The method as claimed in claim 1, wherein the plastics comprise polyolefins.

17. The method as claimed in claim 16, wherein the polyolefins comprise polyethylene or polypropylene.

18. The method as claimed in claim 2, wherein a mean value or a weighted mean value is calculated from the NIR spectra of various sides of the bale.

19. The method as claimed in claim 2, wherein the visual system is a color camera.

20. The method as claimed in claim 2, wherein an image is recorded by the visual system of the at least one side of the bale of which an NIR spectrum is also detected.

* * * * *